J. L. MASON.
Chucks for Forming Sheet-Metal Screw-Caps.

No. 157,720.  Patented Dec. 15, 1874.

Witnesses
L. F. Brous.
A. P. Grant.

Inventor
John L. Mason
by John A. Wiedersheim
Atty.

UNITED STATES PATENT OFFICE.

JOHN L. MASON, OF NEW BRUNSWICK, NEW JERSEY.

IMPROVEMENT IN CHUCKS FOR FORMING SHEET-METAL SCREW-CAPS.

Specification forming part of Letters Patent No. 157,720, dated December 15, 1874; application filed July 27, 1874.

*To all whom it may concern:*

Be it known that I, JOHN L. MASON, of New Brunswick, in the county of Middlesex and State of New Jersey, have invented a new and useful Improvement in Chucks for Manufacturing Sheet-Metal Screw-Caps; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1:
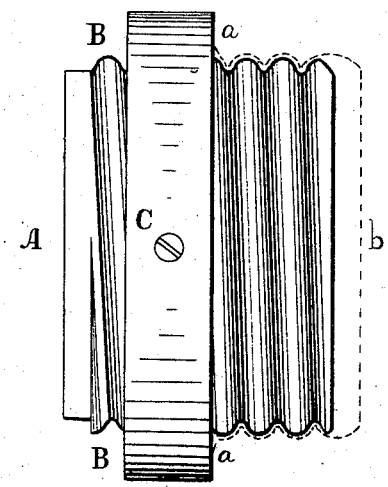
Figure 2:
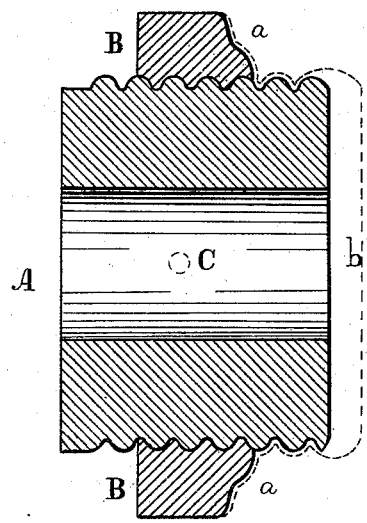

Figure 1 is a side elevation of the device embodying my invention. Fig. 2 is a central longitudinal section thereof.

Similar letters of reference indicate corresponding parts in the two figures.

This invention relates to the manufacture of sheet-metal screw-caps; and consists in a chuck rendered adjustable, so as to adapt the same to the manufacture of caps of varying depths, the chuck being detachable from its shaft, whereby one chuck may be removed and another applied.

Referring to the drawings, A represents the chuck or chuck-head, which is made detachable from the operating rotary shaft, whose surface is threaded and designed to swage threads on sheet-metal caps in a manner well known. B represents a collar, which is internally threaded, and fitted on the chuck A so as to have longitudinal motion thereon. The face *a* of the collar will have a contour corresponding to that of the edge portion of the cap.

In Fig. 1 the face *a* is shown straight or right-lined, and in Fig. 2 the face is shown ogee; but other forms may be adopted.

It will be seen that the cap placed on the chuck will rest against the collar, so as to be properly supported during the thread-swaging operation. The collar may be moved toward or from the front *b* of the chuck, in order to support caps of various depths, and when adjusted will be held by a screw, C, which, passing through the collar, tightens against the chuck.

Having thus described my invention what I claim as new, and desire to secure by Letters Patent, is—

The adjustable collar B, having a contour or face, *a*, and the holding-screw C, in combination with the detachable screw-chuck A, substantially as and for the purpose set forth.

JOHN L. MASON.

Witnesses:
JOHN A. WIEDERSHEIM,
A. P. GRANT.